Sept. 4, 1956 R. W. BIEZE 2,761,321

TUNER MECHANISM

Filed July 2, 1953 3 Sheets-Sheet 1

Inventor
Rolland Warren Bieze
By
Schroeder, Merriam, Hofgren & Brady
Attorneys

Sept. 4, 1956 R. W. BIEZE 2,761,321

TUNER MECHANISM

Filed July 2, 1953 3 Sheets-Sheet 2

Inventor

Rolland Warren Bieze

By

Schroeder, Merriam, Hofgren & Brady

Attorneys

Sept. 4, 1956

R. W. BIEZE 2,761,321

TUNER MECHANISM

Filed July 2, 1953

3 Sheets-Sheet 3

Inventor
Rolland Warren Bieze
By
Schroeder, Merriam, Hofgren & Brady
Attorneys

United States Patent Office 2,761,321

Patented Sept. 4, 1956

2,761,321

TUNER MECHANISM

Rolland Warren Bieze, Des Plaines, Ill., assignor to The Hallicrafters Co., a corporation of Delaware Application July 2, 1953, Serial No. 365,578

9 Claims. (Cl. 74—10.5)

This invention relates to rotatable drive mechanisms, and more particularly to mechanisms for effecting the tuning of a television receiver.

New television receivers are now being built to receive U. H. F. and V. H. F. signals from transmitting stations. Two separate manually operated tuners are needed to accommodate the wide range of frequencies used. Normally, at least two tuning dials and two separate tuning controls are needed for the two tuners. The arrangement is further complicated by the necessity for a very fine tuning adjustment for the U. H. F. stations. Fine adjustment is also desirable for V. H. F. stations, and receivers now on the market are so arranged.

The present invention satisfies all of the tuning requirements above in a simple and novel manner. A conventional rotary selector switch permits choice of the desired one of the 12 V. H. F. channels, while a knob operating from the same shaft as the selector switch controls a trimmer condenser which provides fine tuning adjustment for the V. H. F. tuner. The selector switch is also adapted to make operative connections to the U. H. F. portion of the receiver. When this is done, the rotatable drive mechanism, operated by the knob controlling the V. H. F. trimmer condenser, provides both rough and fine tuning adjustment for the U. H. F. tuner. Thus, a single manually rotatable tuning assembly is utilized to tune the U. H. F. and V. H. F. preselector portions of a television receiver and to provide both portions with a fine tuning adjustment.

A principal feature of this invention is the provision of a pair of drive systems operating from a single manually rotatable operating member.

Another feature is the provision of a construction having a series of stops, pulleys, and friction disks for the two drive systems so that the tuning apparatus will be simple and durable, yet inexpensive to manufacture compared to gear-type drives.

Still another feature of the invention is the provision of a slip-clutch arrangement whereby one of the drive systems can take over and render the other drive system inoperative.

Figure 1:
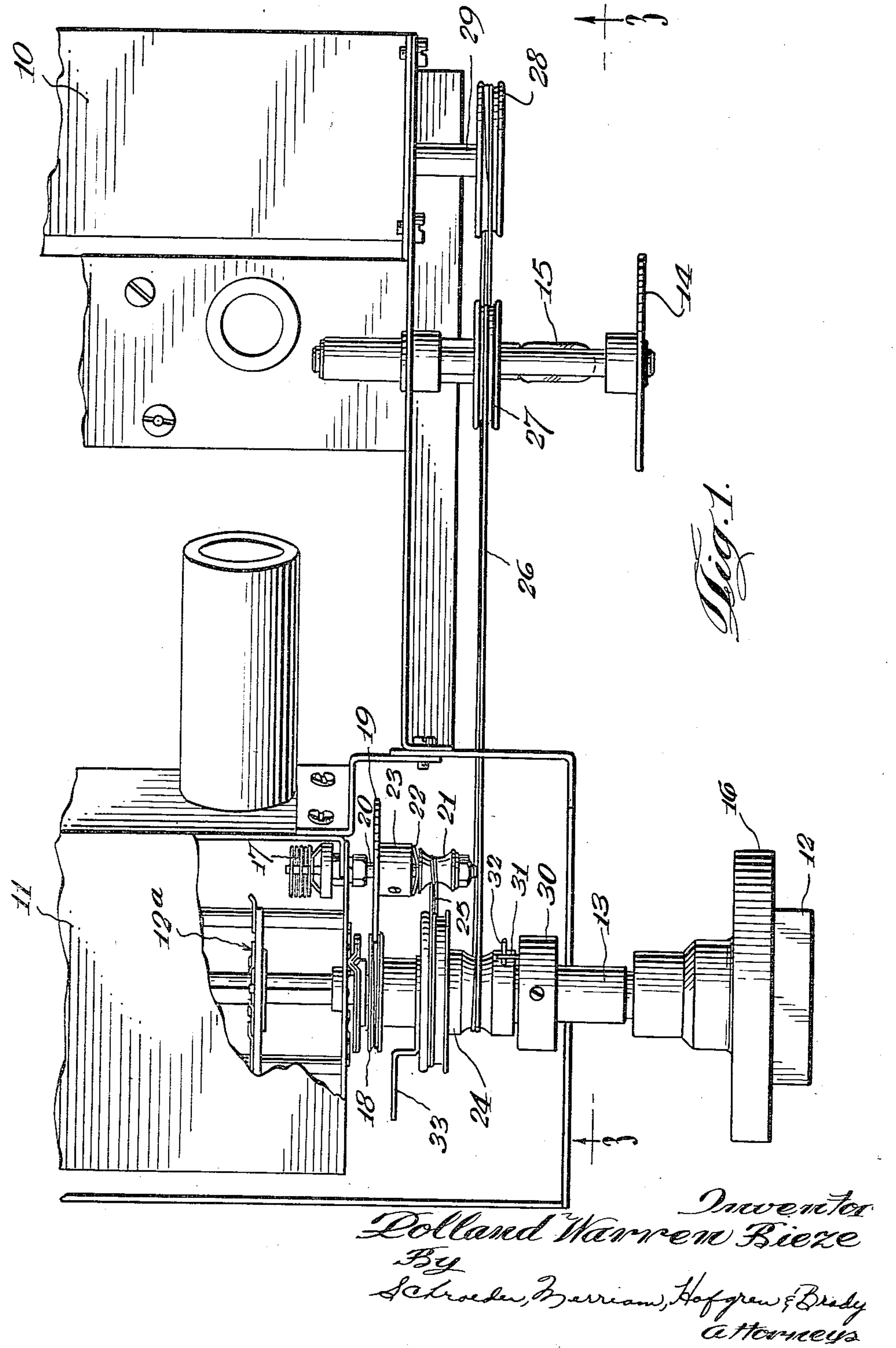
Figure 2:
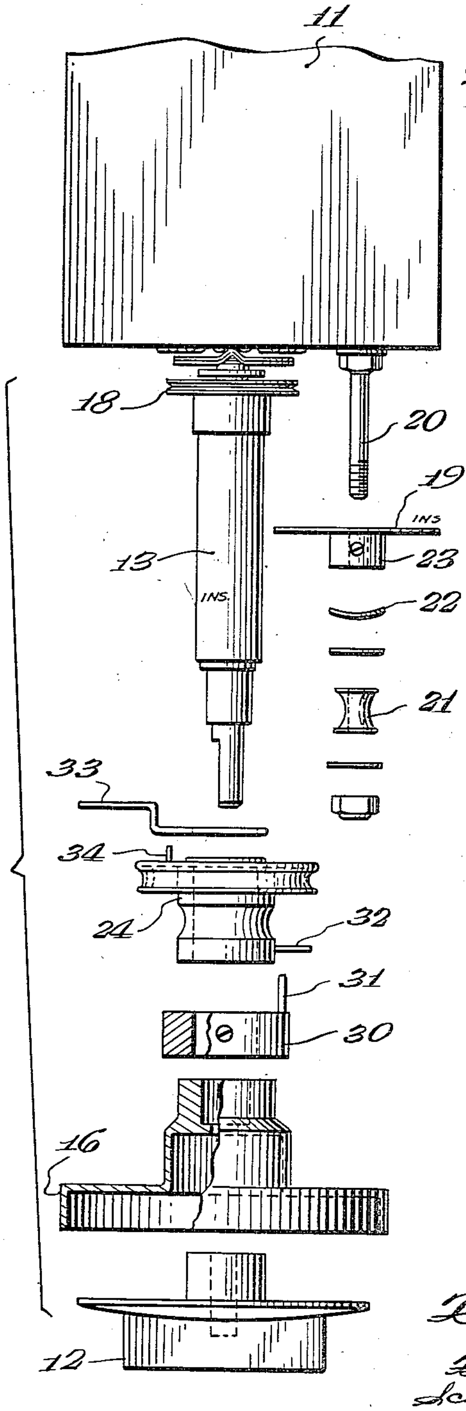
Figure 6:
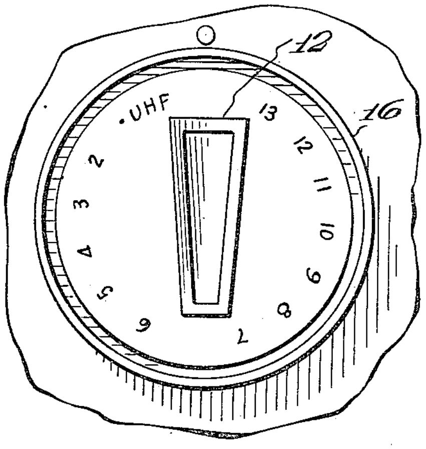
Figure 3:
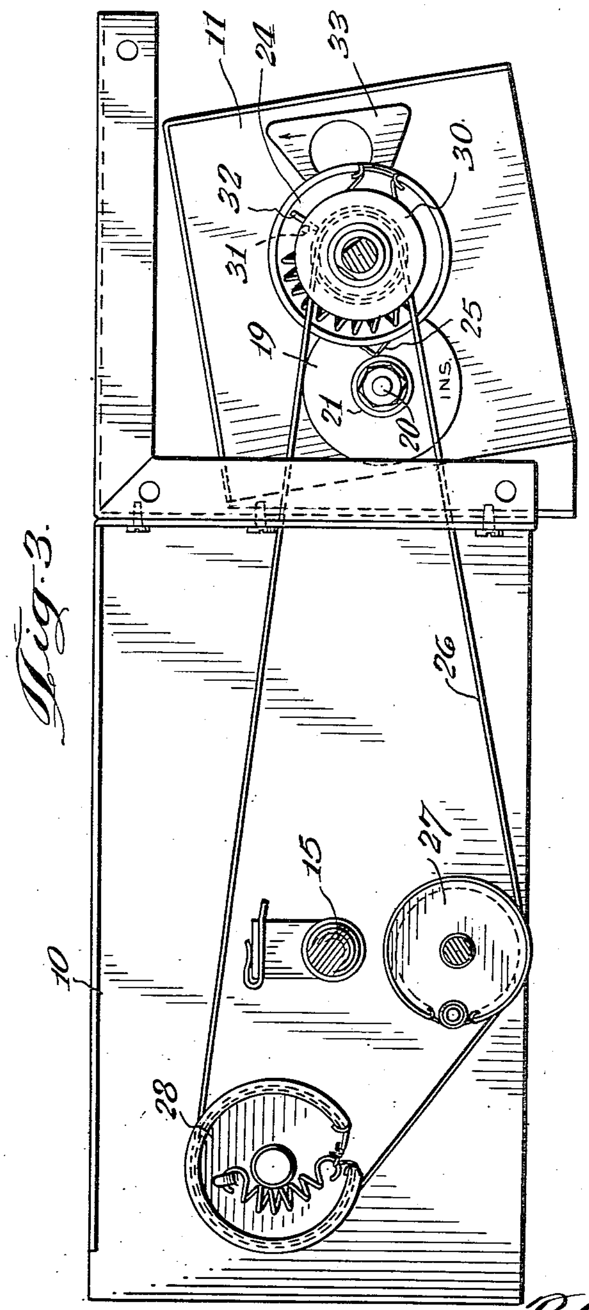
Figure 5:
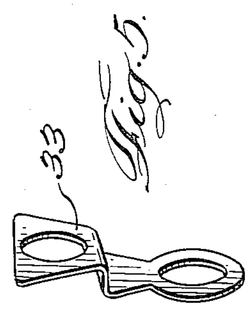
Figure 4:
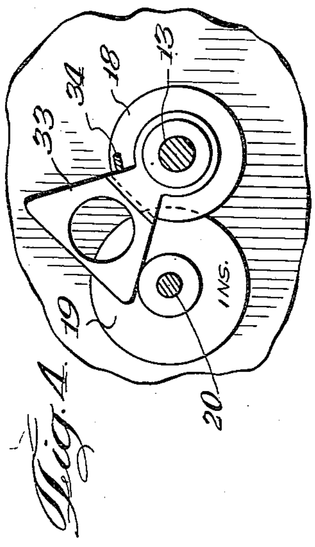

The invention is illustrated in a preferred embodiment in the accompanying drawings, in which:

Fig. 1 is a bottom plan view of an embodiment of the invention;

Fig. 2, an exploded view of a portion of the drive systems of the invention;

Fig. 3, a front vertical sectional view taken as indicated on line 3—3 of Fig. 1;

Fig. 4, a fragmentary elevational view showing the stop member in engagement with the idler shaft;

Fig. 5, a perspective view of the stop member;

Fig. 6, an elevational view of the tuning assembly; and

Figure 7:
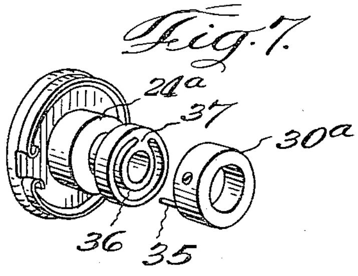

Fig. 7, a view in perspective showing an alternative form for engaging one drive system.

In the embodiment illustrated, 10 designates a portion of a television receiver housing the U. H. F. tuner, and 11 designates that portion housing the V. H. F. tuner.

A channel selector control 12 is attached to a manually rotatable operating member, herein shown as a shaft 13, which can be turned to effect selection of the desired one of the twelve channels through a rotary selector switch 12*a*.

When the channel selector control 12 is turned to U. H. F., operative connections are made through the selector switch 12*a* to the U. H. F. tuner. The channel at which the U. H. F. tuner is set is indicated by a dial 14 which is graduated to show the entire U. H. F. band. The tuning of a given frequency in this band is quite critical since the spread given it by the V. H. F. tuner is very limited. The dial 14 is illuminated by a light 15 positioned in the chassis of the receiver.

A knob 16 for controlling a trimmer condenser 17 associated with the tuned circuit of the local oscillator of the V. H. F. tuner and for effecting tuning of the U. H. F. tuner is keyed to the shaft 13. A friction disk 18 is also keyed to the shaft 13 and drives a second friction disk 19 on an idler shaft 20 which, in turn, rotates the variable trimmer condenser 17. In operating the V. H. F. portion of the receiver, the dial switch is turned to the desired channel, and by rotating the knob 16, a fine tuning adjustment is attained.

The rotation of the knob 16 also brings into operation two separate drive systems providing both a rough and a fine tuning adjustment for the U. H. F. portion of the receiver. The first drive system includes a motion-reducing arrangement coupling the shaft 13 to a rotatable drive means, here shown as a floating drive pulley 24. Rotation of the knob 16 drives the idler shaft 20 through the friction disks 18 and 19, affixed to shafts 13 and 20, respectively. An idler pulley 21 is caused to turn with the shaft 20 through the action of a friction clutch, herein shown as a spring washer 22, engaging adjacent faces of the idler pulley 21 and a collar 23 secured to the disk 19.

The idler pulley 21 is joined to the floating drive pulley 24 on the shaft 13 by a flexible cord 25. A second flexible cord 26, in turn, connects the pulley 24 with an idler pulley 27 which turns the dial 14, and a pulley 28 which rotates the shaft 29 to provide adjustment of the U. H. F. tuner. Since the drive provides motion reduction through proper selection of the sizes of the various disks and pulleys, the U. H. F. tuner is turned very slowly and fine adjustment is provided.

The second drive system is a rapid speed arrangement which takes over from the first system and renders it inoperative. As best shown in Figs. 1 and 2, a collar 30 is keyed to the shaft 13 adjacent the floating drive pulley 24. An engaging stud 31 on the collar 30 is adapted to contact a similar stud 32 on the pulley 24. When this occurs, the floating drive pulley 24 is directly driven by the shaft 13 and is rotated much faster than when driven by the first drive system. The second flexible cord 26 still drives the idler pulley 27 and the pulley 28, but at a much faster rate to provide rapid and rough adjustment of the U. H. F. tuner.

Since the floatingly mounted pulley 24 is still in driving engagement with the initial system, some slippage must occur in the first system because of the action of the second drive system upon pulley 24. Such slippage is provided for by the friction clutch 22 between the idler pulley 21 and the collar 23. Generally, a pair of half hitches are placed in the cord 25 about the idler pulley 21 to increase the frictional engagement between the cord and the pulley. When the second drive system is operating, the pulley 24 drives the idler pulley 21 at several times its normal speed causing slippage between the adjacent faces of the idler pulley 21 and the collar 23, and rendering the first drive system inoperative in driving the U. H. F. tuner. When the knob 16 is reversed to withdraw the stud 31 from contact with the stud 32, the first drive system immediately resumes its operation to provide a fine tuning adjustment for the U. H. F. tuner.

Means is provided to prevent excessive rotation of the U. H. F. tuner in both directions. The movement in either direction of the shaft 13 which drives the U. H. F. tuner is ultimately limited by a stop member 33, loosely mounted on the shaft 13. A stud 34 on the pulley 24 engages the stop and carries it about the shaft 13 until the stop strikes the idler shaft 20 to limit the movement of shaft 13 in both directions. The shape of the stop member and the relationship between the pulleys is such that the stop member 33 strikes the idler shaft 20 slightly after the time that the U. H. F. tuner completes its sweep across the U. H. F. band of frequencies.

In Fig. 7 an alternative form of engagement between the collar 30*a* and the pulley 24*a* is shown. A pin 35 fits into an annular recess 36 in the pulley 24*a*. Rotation of the knob 16 drives only the first drive system as long as the pin 35 rotates freely within the recess. When the pin strikes the solid portion 37 in the pulley 24 between the ends of the annular recess 36, the pulley 24 is driven directly from the collar 30 and the manually rotatable shaft 13. The first drive system is rendered inoperative by slippage in the same manner as described above.

To tune the U. H. F. portion of the set, the knob 16 is turned until the dial 14 is positioned at a point just beyond the desired channel. The knob is then reversed so that the fine tuning adjustment can be utilized in locating the station precisely. The fine tuning range established is slightly less than one rotation of knob 16, that is, fine tuning continues until the studs 31 and 32 come again into driving engagement.

The foregoing detailed description is given for clearness of understanding only and no unnecessary limitations should be understood therefrom, for some modifications will be obvious to those skilled in the art.

I claim:

1. Apparatus for manually tuning two separate tuners in a television receiver from a single manual operating member, comprising: a manually rotatable shaft operably coupled to the tuning means for one tuner; a tuning shaft for said other tuner; a floating drive pulley mounted on said manually rotatable shaft and operatively connected to said tuning shaft; an idler shaft substantially parallel to said manually rotatable shaft; and a pair of drive systems, said first system comprising a motion transmitting member on said manually rotatable shaft to drive said idler shaft, a friction clutch having one element connected to said motion transmitting member and the other element connected to said floating drive pulley to drive said tuning shaft slowly for fine tuning adjustment, and a second drive system comprising an engaging member adapted to cooperate with said floating drive pulley to drive said tuning shaft rapidly for rough tuning adjustment, the cooperation of said engaging member with said floating drive pulley nullifying the effect of said first drive system by causing slippage in said friction clutch.

2. An apparatus as specified in claim 1, in which a stop member mounted upon said manually rotatable shaft limits the rotation of said shaft in either direction by abutting with said idler shaft.

3. A rotatable drive mechanism comprising: a rotatable operating member; rotatable drive means mounted on said rotatable operating member and operatively connected to a member to be driven; an idler shaft; and a pair of drive systems for said member to be driven, said first drive system comprising a motion transmitting member on said rotatable operating member driving said idler shaft, a friction clutch having one element connected to said motion transmitting member and the other element connected to said rotatable drive means to drive said member to be driven at a given velocity, and a second drive system comprising an engaging member adapted to cooperate with said rotatable drive means to drive said member to be driven at a velocity different than said given velocity, the cooperation of said engaging member with said rotatable drive means nullifying the effect of said first drive system by causing slippage in said friction clutch.

4. A rotatable drive mechanism comprising: a rotatable operating member; rotatable drive means operatively connected to a member to be driven; a friction clutch; and a pair of drive systems for said rotatable drive means, one system including a motion reducing drive comprising a drive pulley on said rotatable operating member, an idler shaft, an idler pulley on said idler shaft; and means operatively connecting said pulleys through said friction clutch to said rotatable drive means to drive said first system and the member to be driven, and the other system including a lost motion connection adapted to couple said rotatable operating member directly to said rotatable drive means, the use of said other system causing slippage in said friction clutch, said drive systems effecting rotation of said rotatable drive means at different rates.

5. A rotatable drive mechanism comprising: a rotatable operating member; rotatable drive means operatively connected to a member to be driven; and a pair of drive systems for said rotatable drive means, one system including a motion transmitting member coupled to said rotatable operating member, an idler pulley, a friction clutch operatively connecting said motion transmitting member to said idler pulley, and means operatively connecting said idler pulley to said rotatable drive means to drive said member to be driven, and the other system including a lost motion connection adapted to couple said rotatable operating member directly to said rotatable drive means, the use of said other system causing slippage in said friction clutch, said drive systems effecting rotation of said rotatable drive means at different rates.

6. A rotatable drive mechanism comprising: a rotatable operating member; rotatable drive means operatively connected to a member to be driven; and a pair of drive systems for said rotatable drive means, one system including a drive pulley on said rotatable operating member, an idler shaft, an idler pulley on said idler shaft, means operatively connecting said pulleys, a second idler pulley on said idler shaft, a friction slip clutch operatively connecting said two idler pulleys, and means operatively connecting said second idler pulley to said rotatable drive means to drive said member to be driven, and the other system including a lost motion connection adapted to couple said rotatable operating member directly to said rotatable drive means, the use of said other system causing slippage in said friction clutch, said drive systems effecting rotation of said rotatable drive means at different rates.

7. A rotatable drive mechanism comprising: a rotatable operating member; rotatable drive means operatively connected to a member to be driven; and a pair of drive systems for said rotatable drive means, one system including an idler shaft, a motion transmitting member on said rotatable operating member to rotate said idler shaft, an idler pulley, a friction clutch operatively connecting said motion transmitting member to said idler pulley, and pulley means connecting said idler pulley to said rotatable drive means to drive said member to be driven, said pulley means making at least a double hitch about said idler pulley to insure slippage of said friction clutch when the other drive system is being driven, and the other system including a lost motion connection adapted to couple said rotatable operating member directly to said rotatable drive means, the use of said other system causing slippage in said friction clutch, said drive systems effecting rotation of said rotatable drive means at different rates.

8. Apparatus for effecting the manual tuning of two separate bands of a television receiver from a single manual operating member, comprising: a first tuner; a second tuner; a manually rotatable operating member operably coupled to the tuning means for said first tuner; a rotatable tuning member for said second tuner; rotatable drive means operably connected to said rotatable tuning member; a friction clutch; and a pair of drive systems for said rotatable drive means, one system including means coupling said rotatable operating member through said friction clutch to said rotatable drive means, and the other system adapted to couple said rotatable operating member directly to said rotatable drive means, the use of said other system causing slippage in said friction clutch, said drive systems effecting rotation of said rotatable drive means at different rates.

9. Apparatus for effecting the manual tuning of two separate bands of a television receiver from a single manual operating member, comprising: a first tuner; a second tuner; a manually rotatable operating member operably coupled to the tuning means for said first tuner; a rotatable tuning member for said second tuner; rotatable drive means operably connected to said rotatable tuning member; a friction clutch; and a pair of drive systems for said rotatable drive means, one system including a motion reducing drive coupling said rotatable operating member through said friction clutch to said rotatable drive means, and the other system including a lost motion connection adapted to couple said rotatable operating member directly to said rotatable drive means, the use of said other system causing slippage in said friction clutch, said drive systems effecting rotation of said rotatable drive means at different rates.

References Cited in the file of this patent

UNITED STATES PATENTS 1,694,916 Hickman -------------- Dec. 11, 1928
1,939,856 Langley ---------------- Dec. 19, 1933

FOREIGN PATENTS 609,651 Great Britain ------------ Oct. 5, 1948